United States Patent [19]
Lien

[11] 4,007,421
[45] Feb. 8, 1977

[54] CIRCUIT FOR ENCODING AN ASYNCHRONOUS BINARY SIGNAL INTO A SYNCHRONOUS CODED SIGNAL

[75] Inventor: Monte Deh Lien, Matawan, N.J.

[73] Assignee: Bell Telephone Laboratories, Incorporated, Murray Hill, N.J.

[22] Filed: Aug. 25, 1975

[21] Appl. No.: 607,456

[52] U.S. Cl. .................... 325/38 R; 340/247 DD
[51] Int. Cl.² ................................. H04L 27/02
[58] Field of Search ............... 325/38 R, 38 B, 41, 325/42; 178/68, 50; 179/20 P; 340/146.1 A, 146.1 AB, 146.1 AJ, 347 DD, 347 SY

[56] References Cited
UNITED STATES PATENTS

| | | | |
|---|---|---|---|
| 3,394,312 | 7/1968 | Pfieffer et al. | 325/38 |
| 3,627,946 | 12/1971 | Inoue et al. | 325/38 R |
| 3,754,238 | 8/1973 | Oswald | 340/347 DD |

*Primary Examiner*—Benedict V. Safourek
*Attorney, Agent, or Firm*—Roy C. Lipton

[57] ABSTRACT

Successive intervals of an asynchronous binary signal are examined for the occurrence of transitions and each transition is encoded into a 2-bit binary code word. The occurrence of two transitions within a predetermined interval of time indicates that the asynchronous signal is distorted. A first code word is generated in response to the first transition to indicate to remote decoding apparatus the occurrence of the first transition within the interval of actual ocurrence. A second code word is generated in response to the second transition to indicate to the remote decoding apparatus the occurrence of the second transition in an interval immediately subsequent to the interval in which the second transition actually occurred. Polarity information is periodically transmitted to the decoding apparatus to ensure that the polarity of the asynchronous signal reproduced by the decoding apparatus is the same as the polarity of the original asynchronous signal.

10 Claims, 6 Drawing Figures

CIRCUIT FOR ENCODING AN ASYNCHRONOUS BINARY SIGNAL INTO A SYNCHRONOUS CODED SIGNAL

FIELD OF THE INVENTION

This invention relates to the encoding of asynchronous binary signals into synchronous binary code words and more particularly to the encoding of transitions in an asynchronous binary signal into binary code words.

DESCRIPTION OF THE PRIOR ART

Various schemes exist for the encoding of asynchronous binary signal transitions into synchronous binary code words. One such scheme is disclosed in U.S. Pat. No. 3,394,312, issued to S. B. Pfeiffer et al. on July 23, 1968. In that scheme, an asynchronous binary signal is divided into observation intervals equal in duration to the asynchronous signal's minimum period and each interval is examined for the occurrence of a transition in the binary signal. Each transition is then encoded into a synchronous three-bit code word with the first bit acting as a transition bit to indicate that a transition has taken place, the second bit acting as a timing bit to indicate the time at which the transition occurred and the third bit acting as a polarity bit to signal the polarity of the transition. Each code word is inserted into a time slot of a synchronous data stream with each time slot equal in duration to the duration of an observation interval. The synchronous data stream is then transmitted to remote decoding apparatus which recreates each transition to thereby reproduce the asynchronous signal.

A problem with this scheme and other schemes known in the art is their inability to handle certain distorted asynchronous signals. For example, an incoming asynchronous signal could be distorted due to an improperly balanced incoming line and, as a result, the instant period of the asynchronous signal could be less than the observation interval. Therefore, two transitions could occur within one observation interval. The prior art coding schemes properly encode the first transition and ignore the second transition thereby causing the asynchronous signal to be improperly reproduced at the decoding apparatus.

It is therefore a broad object of this invention to properly encode each transition in an asynchronous binary signal into a synchronous binary code word.

It is a further object of this invention to encode the transitions in an asynchronous binary signal into synchronous binary code words which permit remote decoding apparatus to compensate for distortion in the asynchronous binary signal.

The prior art coding schemes described above transmit transition polarity information with each code word in each time slot of the synchronous data stream. As transition polarity in a binary signal normally alternates, such information is highly redundant and transmitting such information with each code word is an unnecessary waste of time slots in the synchronous data stream.

It is therefore a further object of this invention to eliminate the necessity of transmitting polarity information in each time slot of the synchronous data stream.

SUMMARY OF THE INVENTION

In accordance with one aspect of the invention, after a first code word is generated in response to the occurrence of a first asynchronous signal transition within an observation interval, a second code word is generated in response to the occurrence of a second asynchronous signal transition within the same observation interval.

It is a feature of the invention that the second code word is encoded to indicate the occurrence of the second transition at a predetermined point in an observation interval immediately subsequent to the observation interval in which the transition actually occurred.

It is a further feature of the invention that the first code word is inserted in a first time slot of a synchronous data stream, the first time slot being dedicated to the observation interval in which the first transition occurs and the second code word is inserted in a second time slot which occurs subsequent to the first time slot and is dedicated to the same observation interval.

It is another feature of the invention that transition polarity information is transmitted to the remote decoding apparatus independent of the code words and at periodic intervals much greater in duration than the duration of a synchronous time slot.

The foregoing and other objects and features of this invention will be more fully understood from the following description of an illustrative embodiment thereof taken in conjunction with the accompanying drawings.

DETAILED DESCRIPTION

Figure 1:
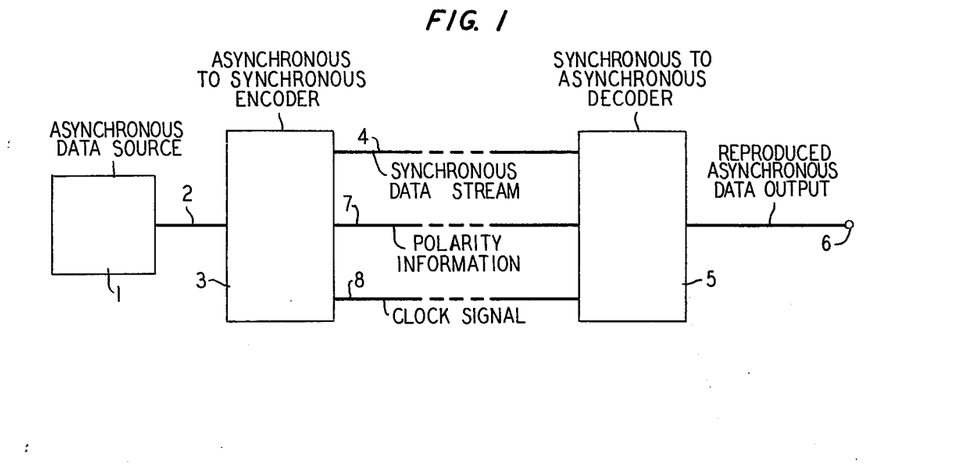
FIG. 1 shows in block diagram form a transmission system embodying the principles of this invention.
Figure 2:
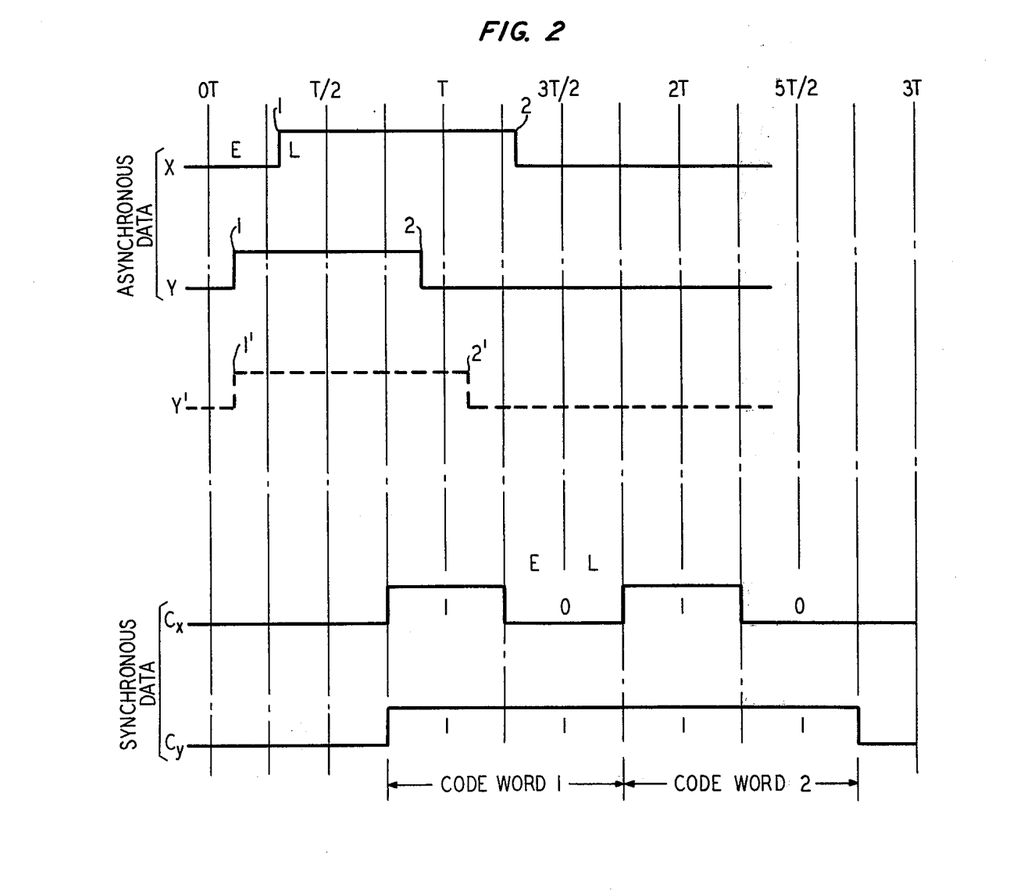
FIG. 2 shows various waveforms useful in understanding this invention.

Refer to FIG. 1. Therein is shown a block diagram of apparatus for encoding an asynchronous data signal into a coded synchronous data stream and apparatus for decoding the synchronous data stream and for reproducing the asynchronous data signal. Asynchronous data source 1 is a source of asynchronous data such as is shown in FIG. 2, waveforms X and Y. This data is transmitted to encoder 3 over transmission path 2 where it is sampled and encoded into 2-bit synchronous code words such as is shown in FIG. 2, waveforms $C_x$ and $C_y$. The code words are in turn formed into a synchronous data stream for transmission to decoder 5 over the transmission path 4. Decoder 5, in response to the reception of the code words, reproduces the asynchronous data signal and applies the signal to output terminal 6. Additional information transmitted to decoder 5 includes periodic polarity information over transmission path 7 and a clock signal over transmission path 8.

The data produced by data source 1 is defined as binary data having a minimum period equal to an interval T and an indeterminate maximum period. Therefore, under nominal conditions, this data will not have more than one transition within an interval T. This data as described above is transmitted over transmission path 2 to decoder 3. Transmission path 2 can be of any data channel and could, for example, be a standard telephone line connected between data source 1 and encoder 3. As is well known, the transmission of data over a telephone line connection, may result in the distortion of the data waveform. Therefore, the data arriving at encoder 3 could very well be a distorted version of the data transmitted from data source 1. For example, waveform X in FIG. 2 depicts an undistorted waveform produced by data source 1 having a period equal to T and therefore contains no more than one transition within any interval less than or equal to T. Waveform Y, in FIG. 2, however, depicts a waveform that has been distorted during transmission from data source 1 to encoder 3. As is shown in FIG. 2, waveform Y, due to the distortion therein, contains two transitions within the interval from OT to T. FIG. Y' depicts waveform Y as it would be if it were undistorted. As will be detailed hereinafter, decoder 3, advantageously encodes both distorted and undistorted asynchronous waveforms for transmission to decoder 5 and moreover, encoder 3 advantageously encodes distorted waveforms in such a way so as to permit decoder 5, when reproducing the asynchronous waveforms, to compensate for the distortion therein.

More particularly, encoder 3 samples each asynchronous waveform four times during any interval equal in duration to T (OT to T, T to 2T, 2T to 3T, etc.). This effectively divides every T interval into equal halves as is shown in FIG. 2, and divides each half, in turn, into an early portion and a late portion. Encoder 3 examines each half interval (T/2) for the occurrence of a transition in the asynchronous waveform. Transition 1 in waveform X, for example, is shown as occurring in the late half of the first T/2 interval. In response to the occurrence of a transition, encoder 3 sets the first set bit of a 2-bit code word to a logical "1" state. Therefore, as shown in FIG. 2, waveform $C_x$, bit 1 of code word 1 is equal to a logical "1" due to the occurrence of transition 1. Encoder 3 next determines if a transition occurs in the early or late half of a T/2 interval. If the transition occurs in the early half of a T/2 interval, the second bit in the 2-bit code word is set to a logical "1" state. Conversely, if the transition occurs in the late half of a T/2 interval, the second bit is set to a logical "0" state. As transition No. 1 in waveform X occurred in the late half of the first interval T/2, the second bit of code word 1 in waveform $C_x$ is equal to a logical "0". Transition No. 2 in waveform X is encoded in the same manner as described above and results in the generation of code word 2 in waveform $C_x$.

The code words, upon generation by encoder 3, are placed into particular time slots of a synchronous data stream and transmitted via transmission path 4 to decoder 5. Each time slot in the synchronous data stream is equal in duration to an interval T. As described above, code word 1 in waveform $C_x$ contains transition information pertaining to transition 1 in waveform X. As is shown in FIG. 2, code word 1 in waveform $C_x$ occupies a time slot in the synchronous waveform equal in duration to an interval T, and this time slot is shifted in time by an interval T/4 from the half interval T/2 in which transition 1 in waveform X occurred. As will be detailed hereinafter, this shift in time is necessary to allow decoder 3 time to detect the occurrence of a transition and to generate a code word in response thereto. Each code word in the synchronous data stream therefore contains transition information pertaining to the occurrence of a single transition in the asynchronous waveform. Each code word in turn occupies a time slot in the synchronous data stream occurring an interval T/4 subsequent to the T/2 half interval in which the transition occurs.

Decoder 5, in response to the reception of the code words, reproduces the asynchronous data waveform by reproducing each transition in the asynchronous waveform and aligning in time the reproduced transition with a predetermined point in either the early or late portion of the half time slot interval T/2 occupied by the second bit of the 2-bit code word. For example, decoder 5, when reproducing transition 1 in waveform X would align in time the reproduced transition with the midpoint of the late half of the second bit of code word 1. The time of occurrence of the reproduced transition is therefore normally shifted in time an interval approximately equal to 5T/4 from the time of occurrence of the original transition as will be detailed hereinafter.

Waveform Y in FIG. 2 represents a waveform that has been distorted during transmission to encoder 3. Transition No. 1 in waveform Y occurs in the early portion of the first half interval T/2. Transition No. 2 in waveform Y however, occurs in the late portion of the second half interval T/2, resulting in the occurrence of two transitions within an interval T, and indicating that this waveform is distorted. Waveform Y' indicates how waveform Y should appear if it were undistorted.

The first transition in waveform Y is encoded in the same manner as described above. As can be seen in FIG. 2, this transition is encoded into the first code word in waveform $C_y$ wherein bit 1 of code word 1 indicates the occurrence of a transition in interval T/2, and bit 2 of code word 1 indicates that the transition occurred in the early portion of the interval T/2. This code word, therefore, when transmitted to decoder 5, will result in the recreation of transition 1 in waveform Y in the manner described above.

Transition 2 in waveform Y when detected by encoder 3 indicates that waveform Y is distorted. In response thereto, encoder 3 advantageously generates code word 2 in waveform $C_y$. As described above, each code word contains transition information concerning one particular transition in the asynchronous waveform. Also, each code word occupies a time slot in the synchronous waveform which is shifted in time by an interval T/4 from the T/2 half interval in which the transition occurred. Therefore, code word 2 in waveform $C_y$ will indicate to decoder 5 the occurrence of a transition in the early portion of half interval T to 3T/2 which occurred an interval T/4 previous to the beginning of code word 2. Referring to FIG. 2, it can be seen therefore that code word 2 advantageously indicates to the decoder 5 that transition 2 in waveform Y actually occurred at the time of transition 2' in waveform Y'. The decoder therefore in response to the reception of code words 1 and 2 in waveform $C_y$ will reproduce waveform Y' rather than reproducing waveform Y and in this manner decoder 5 will compensate for the distortion in the original waveform Y. The manner in which this is accomplished will be described in detail hereinafter.

Figure 3:
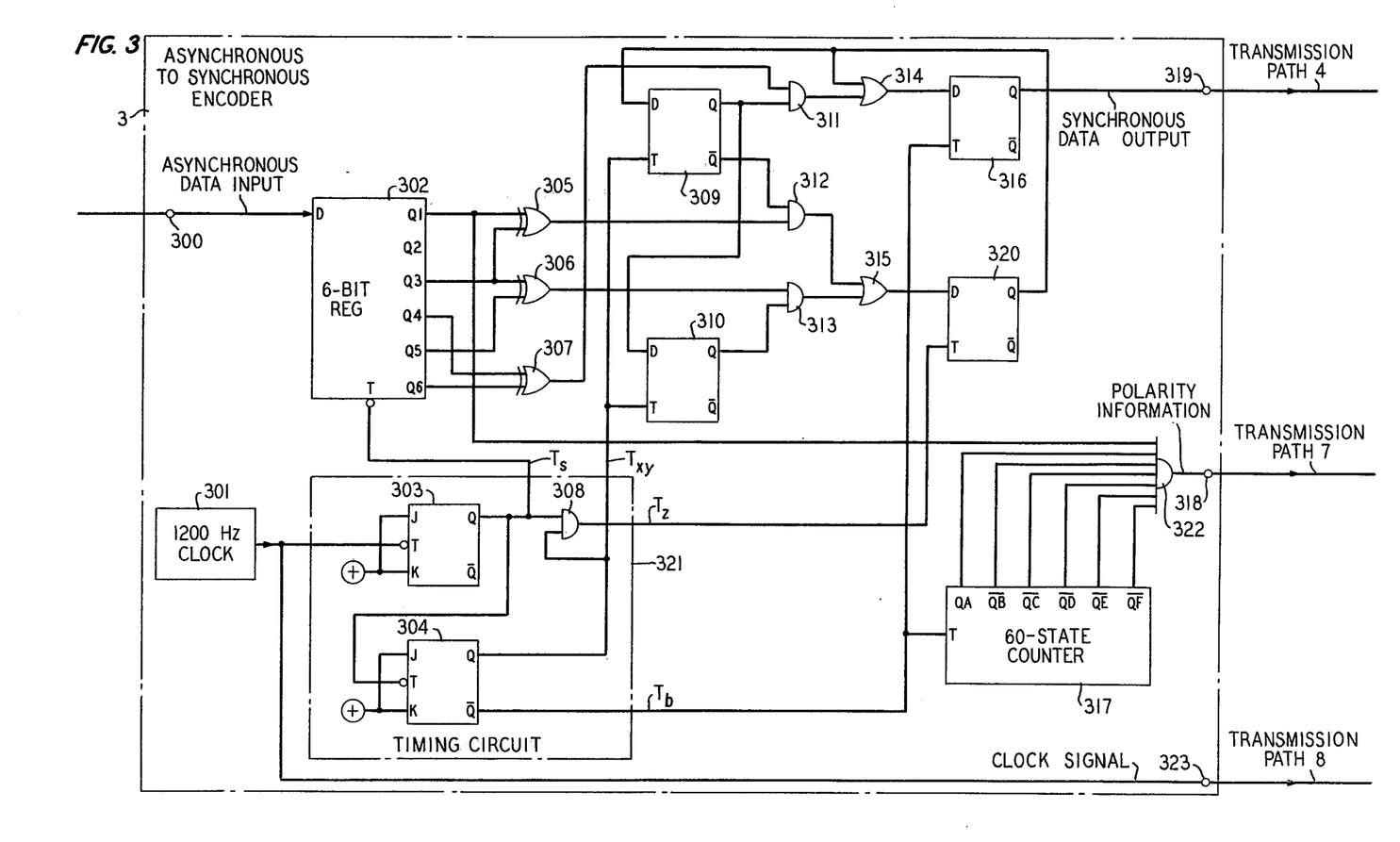
FIG. 3 shows in schematic form the details of encoding logic which encodes an asynchronous waveform into a synchronous data stream.

Refer to FIG. 3. Therein is shown in detail the logic circuitry contained in encoder 3, which is shown in block diagram form in FIG. 1. The circuitry in FIG. 3 is arranged to accept an asynchronous waveform at input terminal 300 of a data rate less than or equal to 150bits-per-second (bps) and encode this waveform into a 300 bps synchronous data stream which is applied to output terminal 319. The synchronous data stream, plus periodic transition polarity information, is transmitted to decoder 5 (FIG. 1) which decodes the synchronous data stream and reconstructs the asynchronous waveform, as will be detailed hereinafter.

Timing signals for the circuitry in FIG. 3 is provided by timing circuit 321 which is driven by a 1200 Hz clock signal generated by clock 301. The 1200 Hz clock signal is also applied to output terminal 323 for transmission to the decoding logic.

Figure 4:
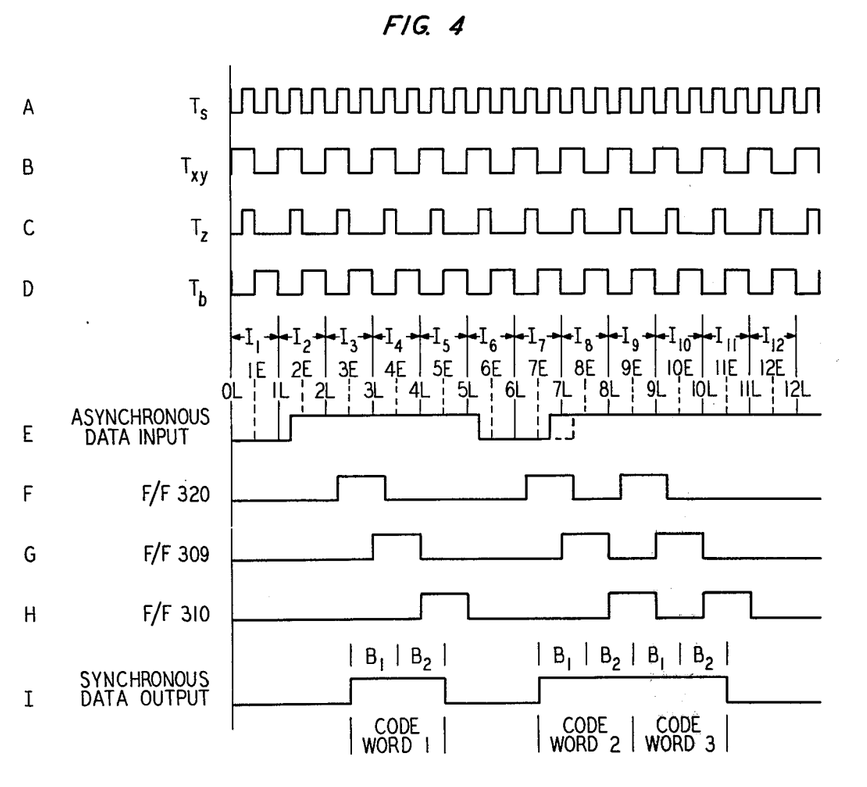
FIG. 4 shows various waveforms useful in understanding the operation of the encoding logic.

Refer to FIG. 4. Therein is shown the various waveforms generated by the circuitry in FIG. 3. Waveform E is the asynchronous data input and is shown in FIG. 4 as having a maximum data rate equal to 150 bps and a minimum period equal to T. It is to be understood, however, that the circuitry in FIG. 3 will properly encode any asynchronous waveform of a data rate less than or equal to 150 bps. Waveform A illustrates clock signal $T_s$ which is equal in frequency to 600 bps. Waveform B illustrates clock signal $T_{xy}$ which is equal in frequency to 300 Hz. Waveform D illustrates clock signal $T_b$ which is the inverse of clock signal $T_{xy}$. Waveform C illustrates clock signal $T_z$ which is simply clock signal $T_s$ with every other positive pulse deleted. Waveforms F, G, and H are the respective outputs of flip-flops 320, 309 and 310 shown in FIG. 3. Waveform I is the synchronous data output which is transmitted to the remote decoding logic. Each bit interval in the synchronous data output is equal to T/2, one half the minimum period of the asynchronous data input.

More specifically, the circuitry in FIG. 3 divides the asynchronous data input into intervals equal to T/2. Each interval is examined for the occurrence of transitions and each transition detected is encoded into a 2-bit code word. The 2-bit code words are used to formulate the synchronous data output by serially transmitting the code words to the remote decoding logic at a synchronous data rate of 300 bps. The first bit in a code word when equal to logical "1" indicates to the decoding logic that a transition has occurred in the asynchronous data signal. The second bit in a code word when equal to logical "1" indicates to the decoding logic that the transition occurred in the first or early half of an interval T/2 and when equal to logical "0" indicates that the transition occurred in the late or second half of an interval T/2. Based on this information, plus periodic transition polarity information, the decoding logic reconstructs the asynchronous waveform at the remote location.

The minimum period of the asynchronous waveform is equal to T. Therefore, the occurrence of two transitions within an interval T indicates that the asynchronous waveform is distorted. When this occurs, the circuitry in FIG. 3 encodes the first of the two transitions within the interval T into a first code word. The second of the two transitions is encoded into a second code word. The second code word is advantageously arranged to indicate to the decoding logic that the second transition occurred in an interval T/2 immediately subsequent to the interval T/2 in which the transition actually occurred. Shifting the second transition in this manner allows the decoding logic to compensate for the distortion in the asynchronous signal as will be detailed hereinafter.

Referring to FIGS. 3 and 4, the specific manner of encoding the asynchronous input is as follows hereinafter. For purposes of this discussion, all flip-flops are assumed to initially be in the CLEAR state. Also, as will be detailed hereinafter, the coding process always begins with a logical "1" being stored in flip-flop 320, which is triggered by the positive edge of the $T_z$ clock pulse.

The asynchronous data input is shifted into register 302 by clock signal $T_s$. Clock signal $T_s$ is four times the frequency of the asynchronous input signal so that the input signal is sampled 4 times during each interval T and the samples are stored in register 302. Sampling the input signal in this manner divides each interval T into 2 intervals, each equal to T/2 and each interval T/2 is in turn divided into an early and a late portion. This can be seen in FIG. 4 wherein waveform E is divided into a plurality of intervals ($I_n$, n = 1, 2, 3) each equal to T/2 and each interval $I_n$ is in turn shown as having an early portion and a late portion. After $5T_s$ clock pulses, therefore, 5 samples will be stored in register 302. Sample OL will be stored in stage Q5, sample 1E will be stored in stage Q4, sample 1L will be stored in stage Q3, sample 2E in stage Q2 and sample 2L in stage Q1. As is shown in FIG. 4, a transition occurs in the asynchronous input between sample 1L and sample 2E. The occurrence of the transition is detected with EXCLUSIVE-OR gate 305. As is evident from FIG. 3, the output of gate 305 will be high when there is a difference in magnitude between the sample stored in stage Q1 (i.e., sample 2L) and the sample stored in stage Q3 (i.e., sample 1L). Therefore, after 5 clock pulses the output of gate 305 goes high and is applied to one input of gate 312. As flip-flop 309 is initially in the CLEAR state, the remaining input of gate 312 is high, thereby causing the output of gate 312 to go high, which in turn, applies a high to the D input of flip-flop 320 through gate 315. On the next $T_z$ clock pulse subsequent to the transition being detected, flip-flop 320 is therefore placed in the SET state. This applies a high to the D input of flip-flop 316 through gate 314. Flip-flop 316 is thereafter placed in the SET state by the next $T_b$ clock pulse thereby generating the first bit ($B_1$) of code word 1. As is shown in FIG. 4, the first bit of code word 1 begins during interval 3E which is an interval T/4 subsequent to the interval $I_2$ in which the transition occurred. This delay, as described above, is necessary to allow the encoding logic to detect a transition and to generate a code word in response thereto.

As described above, the second bit of code word 1 should be equal to a logical "1" as transition 1 occurred in the early half of the $I_2$ interval. This is accomplished through the use of gate 307. As is shown in FIG. 4, just previous to the beginning of the second bit ($B_2$) of code word 1, flip-flop 320 is in the "0" state, flip-flop 309 is in the "1" state, and flip-flop 310 is in the "0" state. Also sample 1E is now stored in stage Q6 of register 302 and sample 2E is stored in stage Q4 of register 302. Therefore, the output of gate 307 is high, enabling one input of gate 311. The remaining input of gate 311 is high as flip-flop 309 is in the SET state (see FIG. 4). Therefore, a high is applied to the D input of flip-flop 316 through gate 314 whereby this flip-flop remains SET upon being toggled by the next $T_b$ clock pulse. Therefore the second bit of code word 1 is high, indicating to the decoding logic that transition 1 occurred in the early half of the $I_2$ interval. Flip-flop 316 is returned to the "0" state with the next $T_b$ clock pulse as is shown in FIG. 4.

Transition 2 in the asynchronous input occurs in the early half of interval $I_6$. As is shown in FIG. 4, the coding process begins at the occurrence of the $T_z$ pulse following the detection of transition 2. At this time, sample 6L is stored in stage Q1 of register 302, and sample 5L is stored in stage Q3 of register 302. Therefore, the output of gate 305 goes high. At this time, flip-flop 309 is in the CLEAR state so gate 312 is enabled applying a high to the D input of flip-flop 320. In response thereto, the flip-flop 320 is placed in the SET state by the next $T_z$ clock pulse. This applies a high to the D input of flip-flop 316 which is placed in the SET state by the next $T_b$ clock pulse thereby generating a logical "1" for the first bit ($B_1$) of code word 2. The second bit of code word 2 will also be equal to a logical "1" as transition 2 occurred in the early half of interval $I_6$. This bit is set equal to a logical "1" in the same manner as has been described above.

Transition 3 in the asynchronous data input occurs in the late half of interval $I_7$. As is shown in FIG. 4, this transition occurs within an interval T of transition 2. As the minimum undistorted period of the asynchronous data is equal to T, the occurrence of two transitions within an interval T indicates that the asynchronous data input is distorted. In response thereto, code word 3 is generated which will, as described hereinafter, indicate to the decoding logic the occurrence of transition 3 in the interval $I_8$ which is an interval T/2 immediately subsequent to the $I_7$ interval of actual occurrence, thereby allowing the decoding logic to compensate for the distortion in the input signal.

The manner in which the encoding logic detects the occurrence of two transitions within an interval T can be perceived by referring to FIG. 4. As is shown therein and has been described above, the encoding logic responds to the occurrence of a first transition within an interval T by placing flip-flop 320 in the SET state. This in turn results in flip-flop 316 being placed in the SET state thereby generating the first bit of a code word. Flip-flop 320 being placed in the SET state also applies a high to the D input of flip-flop 309. Flip-flop 309 is therefore placed in the SET state with the next $T_{xy}$ clock pulse. The relationship of flip-flop 309 being SET and the previous occurrence of a transition in the asynchronous data input can be observed by referring to waveforms E and G in FIG. 4. As is shown therein for transition 1 and 2 flip-flop 309 is placed in the SET state in the $I_4$ interval which is an interval T subsequent to the interval $I_2$ in which the transition occurred. Similarly, flip-flop 309 is placed in the SET state in the $I_8$ interval in response to transition 2 occurring in interval $I_6$. Therefore, flip-flop 309 being in the SET state indicates that a transition has occurred in the asynchronous data input an interval T previous to the leading edge of the SET state of flip-flop 309.

Referring now to transition 3 in the asynchronous data input it can be seen that sample 7L is the first sample subsequent to the occurrence of transition 3. Immediately previous to the $T_z$ pulse, sample 7L is stored in stage Q1 of register 302 and sample 6L is stored in stage Q3 of register 302. As sample 7E is unequal in magnitude to sample 6L, the output of gate 305 goes high and applies a high to one input of gate 312. The remaining input of gate 312, however, is low as flip-flop 309 is at this time in the SET state. As described above, flip-flop 309 being in the SET state indicates the occurrence of a transition in the asynchronous waveform within the previous interval T. Therefore with gate 312 disabled, flip-flop 320 is prevented from being immediately placed in the SET state in response to the occurrence of transition 3. In summary then, flip-flop 309 being in the SET state indicates the occurrence of a transition within the previous interval T. Gate 312 is thereby disabled preventing the decoding logic from immediately responding to the occurrence of a second transition within the interval T.

The encoding logic advantageously delays responding to transition 3 for an interval T/2. As is shown in FIG. 4, flip-flop 309 remains in the SET state for the $I_8$ interval due to transition 2 occurring in the $I_6$ interval. At the end of the $I_8$ interval, a $T_{xy}$ pulse occurs, which shifts the contents of flip-flop 309 into flip-flop 310, and shifts the contents of flip-flop 320 into flip-flop 309. Therefore, in the $I_9$ interval, flip-flop 309 is in the CLEAR state and flip-flop 310 is in the SET state. At the occurrence of the $T_z$ pulse in interval $I_9$, sample 8L is stored in stage Q1 of register 302, sample 7L is stored in stage Q3, and sample 6L is stored in stage Q5. As sample 6L differs in magnitude from sample 7L, the output of gate 306 goes high, which applies a high to an input of gate 313. Since flip-flop 310 is in the SET state, the other input of gate 313 is also high. Therefore, a high is applied to the D input of flip-flop 320 through gates 313 and 315. In response thereto, flip-flop 320 is placed in the SET state, applying a high through gate 314 to the D input of flip-flop 316 which is in turn placed in the SET state thereby generating the first bit of code word 3 and indicating to the decoding logic the occurrence of transition 3. Flip-flop 320 being placed in the SET state applies a high to the D input of flip-flop 309 which is set in response to the subsequent $T_{xy}$ clock pulse, thereby enabling one input of gate 311. At this same time, sample 9L is stored in stage Q1 of register 302, sample 8E is stored in stage Q4 of register 302 and sample 7E is stored in stage Q6 of register 302. As sample 8E differs in magnitude from sample 7E, the output of gate 307 goes high, and applies a high through enabled gate 311 and gate 314 to the D input of flip-flop 316. Therefore, flip-flop 316 remains in the SET state upon being toggled by the next $T_b$ clock pulse thereby setting bit 2 of code word 3 to a logical "1" and indicating to the decoding logic the occurrence of transition 3 in the early half of interval $I_8$ which is an interval T/4 previous to the beginning of bit 1 of code word 3. As is shown in FIG. 4, code word 3 will therefore indicate to the decoding logic the occurrence of a transition in the position of transition 3' and not in the position of transition 3. Therefore, the decoding logic upon reception of code word 3 will reconstruct transition 3 in the relative position occupied by transition 3' in FIG. 4. In this manner, the decoding logic compensates for the distortion detected in the asynchronous data input.

Additional information generated by the encoding logic and transmitted to the decoding logic is periodic polarity information. This information is necessary as during transmission of the code words to the decoding logic a transmission error could result in the decoding logic not receiving a particular code word and thereby not reproducing a particular transition. Thereafter, the decoding logic would be out of step with the incoming code words resulting in the incorrect reproduction of the asynchronous data waveform. To prevent this periodic polarity information is generated in the following manner. Counter 317 counts the positive transitions of $T_b$ clock pulses. Gate 322 detects the occurrence of count "1" in the count cycle which occurs every 60 $T_b$ bits. At this time, gate 322 is enabled and the asynchronous sample currently stored in stage Q1 of register 302 is transmitted to the decoding logic to be compared with a sample recovered from the reproduced asynchronous waveform in a manner to be detailed hereinafter. If the two samples are equal in magnitude, it indicates that the decoding logic is in step with the encoding logic. If the two samples are different, an error signal is generated to alert the decoding logic of the error.

Figure 5:
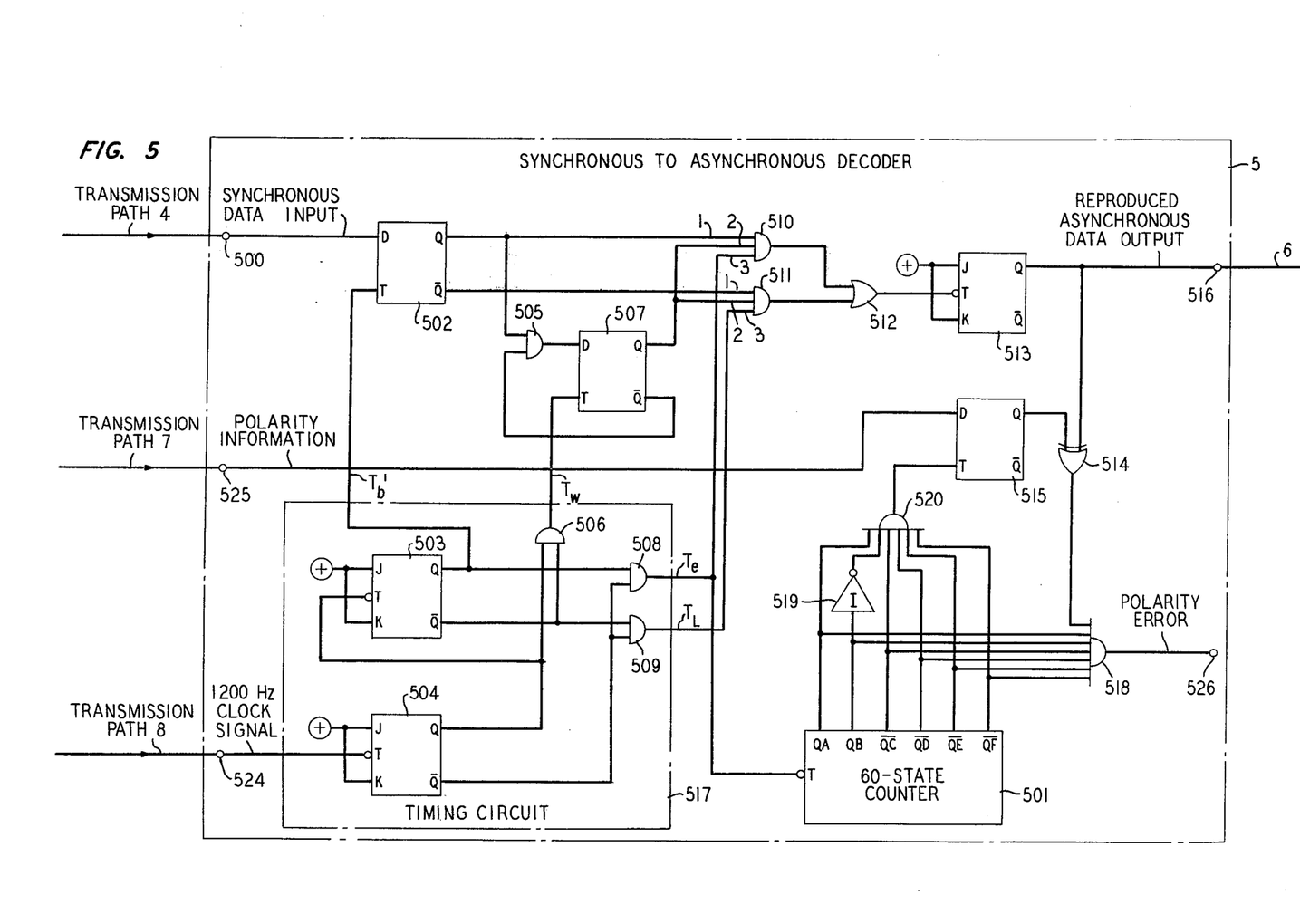
FIG. 5 shows in schematic form the details of decoding logic which decodes the synchronous data stream and reproduces the asynchronous waveform.
Figure 6:
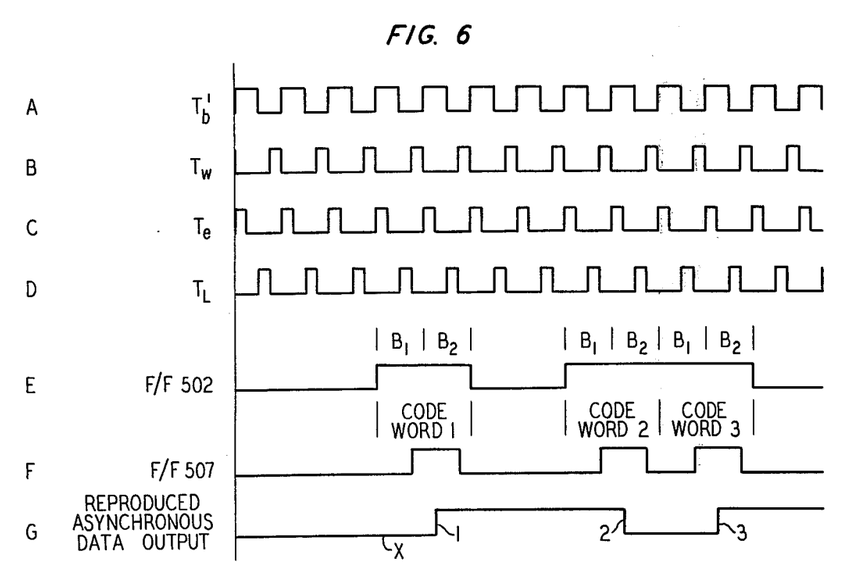
FIG. 6 shows various waveforms useful in understanding the operation of the decoding logic.

Refer to FIG. 5. Therein is shown the asynchronous to asynchronous decoding logic designed to accept the 300 bps synchronous coded waveform and in response thereto to reproduce the 150 bps asyncrhonous waveform. The clock signals necessary to drive the decoding logic are generated by timing circuit 517 which in turn is driven by the 1200 Hz clock signal transmitted from the encoding logic and applied to input terminal 524. The timing waveforms $T_b'$, $T_w$, $T_e$ and $T_l$ generated by timing circuit 517, are shown in FIG. 6. Also shown in FIG. 6 are the outputs of flip-flops 502, 507 and the reproduced 150 bps asynchronous data output.

Before proceeding to a detailed analysis of the logic in FIG. 5, it is necessary to establish a relationship between the various waveforms in FIG. 6. Waveform $T_b'$ in FIG. 6 is generated in the same manner as waveform $T_b$ in FIG. 4, i.e., the 1200 Hz clock is divided by 4 with two flip-flops (503 and 504 in FIG. 5, and 303 and 304 in FIG. 3) connected in series. However, waveform $T_b'$ is taken from the Q output of flip-flop 503 while waveform $T_b$ is taken from the $\overline{Q}$ output of flip-flop 304 (FIG. 3). Therefore, waveform $T_b'$ is the same frequency as waveform $T_b$ but shifted in phase by 180°. Waveforms $T_e$ and $T_l$ divide each bit of the $T_b'$ waveform into an early and late portion. As can be seen from FIG. 6, the negative transition of a $T_e$ clock pulse falls at the midpoint of the early half of a $T_b'$ pulse while the negative transition of a $T_l$ clock pulse falls at the midpoint of the late half of a $T_b'$ clock pulse.

The synchronous code words from the encoding logic are received over transmission path 4 and applied to the D input of flip-flop 502. This flip-flop is toggled by clock signal $T_b'$ which clocks each bit of the incoming synchronous code words into flip-flop 502. As described above, waveform $T_b'$ is shifted 180° in phase from waveform $T_b$ in FIG. 4. Therefore, each code word transmitted from the encoding logic is sampled in the middle of a code word bit when it is clocked into flip-flop 502. Therefore, the output of flip-flip 502 shown in line E of FIG. 6 is identical to the synchronous data output shown in line I of FIG. 4 except it is phase shifted by 180° or one-half of a $T_b$ clock bit.

The output of flip-flop 502 is applied to input 1 of gate 510 and to one input of gate 505. As all flip-flops including flip-flop 507 are initially in the CLEAR state, the remaining input of gate 505 is high which applies a high to the D input of flip-flop 507. This flip-flop is then toggled to the SET state by the next $T_w$ clock pulse which applies a high to input 2 of gate 510 and input 2 of gate 511. The following $T_e$ clock pulse enables gate 510 which in turn toggles flip-flop 513 to the SET state through gate 512. Flip-flop 513 being toggled to the SET state reproduces transition 1 in the reproduced asynchronous waveform shown in line G of FIG. 6.

Note that transition 1 was reproduced as a result of the $T_e$ clock pulse and therefore occurs in the early half of bit 2 of code word 1. This transition is therefore reproduced in the early half of an interval T/2 as is indicated by code word 1. If, for example, bit 2 of code word 1 was equal to a logical "0", then transition 1 would have been reproduced in the late half of the second bit of code word 1. As can be seen from FIG. 5, if bit 2 of code word 1 would have been equal to a logical "0", gate 511 would have been enabled rather than gate 510. Therefore, flip-flop 513 would not have been toggled to the SET state until the occurrence of the $T_l$ clock pulse which would have placed transition 1 in the late half of bit 2 of code word 1.

The phase relationship between the reproduced asynchronous waveform and the original asynchronous waveform is evident from a comparison between FIG. 4 and FIG. 6. As is shown in FIG. 4, bit 1 of code word 1 is generated one-half of a $T_b$ bit subsequent to the interval T/2 in which transition 1 of the original asynchronous waveform occurred. As described above the received code words shown in line E of FIG. 6 are shifted an additional one-half of a $T_b$ bit from the synchronous code words transmitted by the encoding logic. Finally, as is shown in FIG. 6, transition 1 in the reproduced asynchronous waveform is reproduced in the early or late half of bit 2 of code word 1 which shifts transition 1 of the reproduced asynchronous waveform a full $T_b'$ bit from the beginning of received code word 1. From the foregoing, therefore, it is clear that transition 1 in the reproduced asynchronous waveform occurs, in real time, 2 $T_b$ bits subsequent to transition 1 in the original asynchronous waveform.

Flip-flop 513 remains in the SET state until the reception of code word 2. In response to bit 1 of code word 2, flip-flop 507 is placed in the SET state as described above. Thereafter gate 510 is enabled by bit 2 of code word 2, by the Q output of flip-flop 507 and the $T_e$ clock pulse thereby toggling flip-flop 513 to the CLEAR state and recreating the second transition in the reproduced asynchronous waveform.

Transition 3 in the reproduced asynchronous waveform is reproduced in response to code word 3 in the same manner as described above. However, as has been previously described, the generation of code word 3 was delayed by the encoding logic an additional interval T/4 more than the normal delay incurred in generating code words 1 and 2. Therefore when reproducing transition 3 the decoding logic locates the transition as indicated by code word 3 which in effect shifts transition 3 an additional interval T/4. As described above, transitions 1 and 2 in the reproduced asynchronous waveform are normally shifted an interval equal to 2 $T_b$ bits from transitions 1 and 2 in the original asynchronous waveform. Shifting transition 3 in the reproduced asynchronous waveform an additional interval T/4 therefore compensates for the distortion in the original asynchronous waveform.

The periodic polarity information from the encoding logic is received over transmission path 7 and applied to terminal 525 in FIG. 5. As described above, the periodic polarity information consists of a sample taken every 60 $T_b$ bits from the original asynchronous waveform. In order to compare this sample with a sample taken at the same point in the reproduced asynchronous waveform, it is necessary to compensate for the phase shift between the original asynchronous waveform and the reproduced asynchronous waveform. This is accomplished as follows. Refer to FIG. 3. Assume, for example, that counter 317 reaches the count of "1" coincidence with sample 3E being clocked into counter 302. Therefore, sample 3E is gated through gate 322 and transmitted as the periodic polarity information via output terminal 318 and transmission path 7 to the decoding logic. The polarity information is received at input terminal 525 (FIG. 5) and applied to the D input of flip-flop 515. The point in real time at which the polarity information reaches the decoding logic is point X in waveform G of FIG. 6. This point is determined by noting that sample 3E in FIG. 4 occurs coincident with the leading edge of the first bit of code word 1 in line I of FIG. 4. Point X can now be established in FIG. 6 by determining the leading edge of bit 1 of code word 1 in line E of FIG. 6 and then moving back in time one-half of a $T_b'$ bit due to the phase difference between the transmitted code words and the code words in FIG. 6. With the establishment of point X it is now necessary to move this point on the reproduced asynchronous waveform to coincide with point 3E on the original asynchronous waveform. This is accomplished through the use of counter 501. Counter 501 is toggled by the negative transitions of the $T_e$ clock pulses and is therefore at count "0" at the time counter 317 in FIG. 3 reaches count "1". One $T_e$ clock pulse subsequent to point X in FIG. 6 counter 501 reaches count 1. This is detected by gate 517 which, in response thereto, applies a toggle pulse to the T input of flip-flop 515, thereby clocking the polarity information (sample 3E) into flip-flop 515. The polarity information stored in flip-flop 515 is then applied to one input of EXCLUSIVE-OR gate 514 and compared with the reproduced asynchronous waveform. There $T_e$ clock pulses subsequent to point X in FIG. 6 counter 501 reaches the count of "3". Referring to FIG. 6, it can be seen that the point in the reproduced asynchronous waveform at which counter 501 reaches the count of "3" corresponds to the position of sample 3E in the original asynchronous waveform. The count of "3" is detected by gate 518 which, in response thereto, gates the output of EXCLUSIVE-OR gate 514 to output terminal 526. As described above, gate 514 compares the magnitude of the incoming polarity information with the magnitude of the reproduced asynchronous waveform and the output of gate 514 will go high if these magnitudes are not both equal to either a logical "1" or a logical "0". The output of gate 514 is gated to output terminal 526 at the point in the reproduced asynchronous waveform which corresponds to the point at which the polarity information was taken from the original asynchronous waveform. Therefore, if output terminal 526 goes high at any time, it indicates that the polarity of the reproduced asynchronous waveform is different than the polarity of the orignal asynchronous waveform. Such an indication could then be used by circuitry which is not part of this invention to either change the polarity of the reproduced asynchronous waveform or to request a retransmission of the information previously sent by the encoding logic.

Although a specific embodiment of this invention has been shown and described, it will be understood that various modifications may be made without departing from the spirit of this invention.

I claim:

1. In a circuit for encoding transitions in an asynchronous binary signal into synchronous code words, means for examining successive intervals of the asynchronous binary signal for the occurrence of transitions, and means responsive to the occurrence of a first transition within an interval for generating a first code word to indicate the occurrence of the first transition within the interval of actual occurrence, characterized in that the generating means further includes,
   means responsive to the occurrence of a second transition within the same interval for generating a second code word to indicate the occurrence of the second transition within an interval immediately subsequent to the interval in which the second transition actually occurred.

2. In a circuit in accordance with claim 1 further including means for transmitting the code words to reproducing means in predetermined time slots of a synchronous data stream, means for producing transition polarity information, and means included in the transmitting means for sending the transition polarity information to the reproducing means independent of the code words and at periodic intervals much greater in duration than the duration of a synchronous time slot.

3. In a circuit in accordance with claim 2 further including means responsive to the occurrence of the first transition for inserting the first code word into a first time slot of the synchronous data stream dedicated to the interval in which the first transition occurred, and means responsive to the occurrence of the second transition for inserting the second code word into a second time slot of the synchronous data stream occurring subsequent to the first time slot and being dedicated to the same interval.

4. In a circuit in accordance with claim 1 wherein each code word comprises two binary bits, the generating means further including means for forming the first bit of a code word to indicate the occurrence of a transition within an interval and for forming the second bit of a code word to indicate a portion within the interval wherein the transition occurred.

5. In a circuit in accordance with claim 3 wherein the reproducing means further includes means responsive to the polarity information for periodically comparing the binary value of the reproduced asynchronous signal with the binary value of the polarity information.

6. A distortion compensation circuit including means for detecting the occurrence of transitions in an asynchronous binary signal, means for determining the point in time of each transition occurrence, and means responsive to the occurrence of a first transition within a predetermined interval for reproducing the first transition at a point in time corresponding to the time of the first transition occurrence, characterized in that the reproducing means further includes,
   means responsive to the occurrence of a second transition within the predetermined interval for shifting the reproduction point of the second transition a predetermined interval from the point in time corresponding to the time of the second transition occurrence.

7. A circuit in accordance with claim 6 wherein the detecting means includes means responsive to the occurrence of the first transition within the predetermined interval for generating a first binary code word and responsive to the occurrence of the second transition within the predetermined interval for generating a second binary code word.

8. A circuit in accordance with claim 7 wherein the reproducing means includes means responsive to the first code word for reproducing the first transition and means responsive to the second code word for reproducing the second transition.

9. In a circuit in accordance with claim 8 further including means for transmitting the code words to the reproducing means in predetermined time slots of a synchronous data stream, means for producing transition polarity information, and means included in the transmitting means for sending the transition polarity information to the reproducing means independent of the code words and at periodic intervals much greater in duration than the duration of a synchronous time slot.

10. A circuit in accordance with claim 9 wherein each code word comprises two binary bits, the detecting means including means for forming the first bit of a code word to indicate the occurrence of a transition within the predetermined interval and the determining means including means for forming the second bit of a code word to indicate the point in time of each transition occurrence.

* * * * *